United States Patent
Donelon (10) Patent No.: US 9,027,365 B2
(45) Date of Patent: May 12, 2015

(54) SYSTEM AND METHOD FOR FORMING FUSED QUARTZ GLASS

(71) Applicant: Heraeus Quartz America LLC, Austin, TX (US)

(72) Inventor: Matthew Donelon, Austin, TX (US)

(73) Assignee: Heraeus Quartz America LLC, Austin, TX (US)

(*) Notice: Subject to any disclaimer, the term of this patent is extended or adjusted under 35 U.S.C. 154(b) by 318 days.

(21) Appl. No.: 13/736,481

(22) Filed: Jan. 8, 2013

(65) Prior Publication Data

US 2014/0190211 A1 Jul. 10, 2014

(51) Int. Cl.
*C03B 23/045* (2006.01)
*C03B 23/049* (2006.01)
*C03B 23/051* (2006.01)

(52) U.S. Cl.
CPC ............. *C03B 23/049* (2013.01); *C03B 23/045* (2013.01); *C03B 23/051* (2013.01)

(58) Field of Classification Search
CPC ...... C03B 20/00; C03B 23/04; C03B 23/045; C03B 23/049; C03B 23/051; C03B 23/08; C03B 2201/02; C03B 23/0093; C03B 23/0013
USPC .................................................... 65/108, 296
See application file for complete search history.

(56) References Cited

U.S. PATENT DOCUMENTS

| | | | |
|---|---|---|---|
| 1,436,878 A * | 11/1922 | Heisey | 65/296 |
| 1,583,464 A * | 5/1926 | Houskeeper | 65/23 |
| 1,857,080 A | 5/1932 | Delpech | |
| 2,735,230 A * | 2/1956 | Morrill, Jr. | 65/55 |
| 3,128,504 A * | 4/1964 | Gewecke | 425/174.8 R |
| 3,186,818 A * | 6/1965 | Havens et al. | 65/169 |
| 3,362,435 A * | 1/1968 | Meyer | 138/178 |
| 4,358,306 A | 11/1982 | Okamoto et al. | |
| 4,361,429 A | 11/1982 | Anderson et al. | |
| 4,514,206 A * | 4/1985 | Roselt et al. | 65/108 |

(Continued)

FOREIGN PATENT DOCUMENTS

| DE | 19521072 C1 | 11/1996 |
|---|---|---|
| EP | 1377528 B1 | 6/2005 |

(Continued)

OTHER PUBLICATIONS

Int'l Search Report and Written Opinion issued Mar. 4, 2014 in Int'l Application No. PCT/US2013/076566.

*Primary Examiner* — Jason L Lazorcik
(74) *Attorney, Agent, or Firm* — Panitch Schwarze Belisario & Nadel LLP (57) ABSTRACT

A method of forming fused quartz glass is provided. The method includes the steps of: (a) providing a starting body made of fused quartz glass; (b) positioning the fused quartz glass starting body on a base plate; (c) inserting a first insert device into an interior cavity of the starting body to form an assembled structure; (d) heating the assembled structure to a predetermined temperature at which the fused quartz glass has a viscosity in a range of $10^5$ to $10^{13}$ poise; and (e) deforming the fused quartz glass of the starting body at the predetermined temperature or in the viscosity range of $10^5$ to $10^{13}$ poise around the first insert device to change a shape of the starting body. A method for making a large fused quartz glass vessel and a forming assembly for forming fused quartz glass are also provided.

15 Claims, 2 Drawing Sheets

(56) References Cited

U.S. PATENT DOCUMENTS

| | | | |
|---|---|---|---|
| 4,731,144 A | 3/1988 | Kommineni et al. | |
| 5,322,539 A * | 6/1994 | Mathisen et al. | 65/42 |
| 5,665,139 A | 9/1997 | Ruppert et al. | |
| 5,906,667 A | 5/1999 | Moulding et al. | |
| 6,368,175 B1 * | 4/2002 | Horiuchi et al. | 445/26 |
| 6,505,484 B1 | 1/2003 | Fujiwara et al. | |
| 6,536,239 B1 * | 3/2003 | Mueller et al. | 65/292 |
| 6,553,789 B1 | 4/2003 | Martin et al. | |
| 6,640,587 B1 * | 11/2003 | Hollesen et al. | 65/169 |
| 6,685,525 B1 * | 2/2004 | Maeda | 445/27 |
| 6,689,516 B2 * | 2/2004 | Berkey et al. | 430/5 |
| 6,766,661 B2 | 7/2004 | Sawada et al. | |
| 6,769,276 B1 * | 8/2004 | Kay et al. | 65/529 |
| 6,789,398 B1 * | 9/2004 | Daoud et al. | 65/357 |
| 6,848,277 B2 * | 2/2005 | Berkey et al. | 65/428 |
| 6,868,699 B2 | 3/2005 | Oiwa et al. | |
| 7,216,510 B2 | 5/2007 | Doehring et al. | |
| 7,373,792 B2 | 5/2008 | Menzel et al. | |
| 7,392,667 B2 * | 7/2008 | Kunert et al. | 65/109 |
| 8,153,336 B2 | 4/2012 | Abe et al. | |
| 2002/0004173 A1 * | 1/2002 | Berkey et al. | 430/5 |
| 2002/0050152 A1 | 5/2002 | Fujiwara et al. | |
| 2003/0106339 A1 * | 6/2003 | Kunert et al. | 65/25.4 |
| 2003/0182967 A1 * | 10/2003 | Tokai et al. | 65/108 |
| 2004/0121247 A1 * | 6/2004 | Berkey et al. | 430/5 |
| 2004/0206123 A1 | 10/2004 | Fotheringham et al. | |
| 2007/0056322 A1 | 3/2007 | Burdette et al. | |
| 2007/0271958 A1 | 11/2007 | Abe et al. | |
| 2008/0282740 A1 * | 11/2008 | Kunert et al. | 65/296 |
| 2009/0142547 A1 | 6/2009 | Burdette et al. | |
| 2010/0000259 A1 | 1/2010 | Ukrainczyk et al. | |
| 2011/0130265 A1 | 6/2011 | Mizuguchi et al. | |
| 2014/0041413 A1 * | 2/2014 | Bartsch et al. | 65/29.1 |

FOREIGN PATENT DOCUMENTS

| | | |
|---|---|---|
| JP | 60-251137 A | 12/1985 |
| JP | 05-017174 A | 1/1993 |
| JP | 07-109137 A | 4/1995 |
| JP | 2001-097731 A | 4/2001 |
| JP | 2004-083308 A | 3/2004 |
| JP | 2004-307263 A | 11/2004 |
| JP | 2004-307264 A | 11/2004 |
| JP | 2004-307265 A | 11/2004 |
| JP | 2004-307266 A | 11/2004 |
| JP | 2004-307267 A | 11/2004 |
| JP | 2006-169033 A | 6/2006 |
| JP | 2007-022847 A | 2/2007 |
| JP | 2009-234858 A | 10/2009 |
| JP | 2010-006679 A | 1/2010 |
| JP | 2010-024084 A | 2/2010 |
| JP | 2010-215432 A | 9/2010 |
| JP | 2011-162392 A | 8/2011 |
| WO | 0055100 A1 | 9/2000 |
| WO | 2012039331 A1 | 3/2012 |

* cited by examiner

SYSTEM AND METHOD FOR FORMING FUSED QUARTZ GLASS

BACKGROUND OF THE INVENTION

The present invention relates to a system and method for forming fused quartz glass or fused silica, more particularly, for shaping fused quartz or fused silica glass into vessels of a desired shape.

Large chambers or vessels made of fused quartz/fused silica glasses (hereinafter referred to as "fused quartz glass" for simplicity) are known in the prior art. Such vessels typically have diameters greater than 200 mm. Such vessels are desirable because they provide a controlled atmosphere for processes that require a controlled and/or non-reactive atmosphere.

Typically, these vessels are formed by welding together separate pieces of fused quartz glass. For example, a conventional forming method involves laser cutting a fused quartz glass tube in half and subsequently welding together the two half tubes and two flat plates made of fused quartz glass. The resulting vessel thus includes one or more welded seams, which may require subsequent grinding. Finally, the vessel must be fire polished to form a completed structure having the desired transparency.

However, such conventional systems and methods are labor intensive, particularly due to the large amount of welding that must be performed and the necessary subsequent grinding of the weld lines to form a completed vessel. For example, it is not uncommon for such conventional forming methods to result in over 10 feet of welding per vessel. In addition, because of the large amount of welding involved, such conventional methods can be hazardous, time-consuming and costly. Specifically, welding of quartz glass requires a high skill level and a great deal of care, as a welding error could result in the entire quartz glass piece shattering, resulting in a total loss of the costly quartz glass material. Thus, it is difficult to make fused quartz glass vessels on a large-scale commercial basis, using such conventional systems and methods.

Accordingly, it would be desirable to provide a method and system for forming quartz glass, particularly into a vessel, which requires minimal mechanical working (e.g., minimal welding and grinding). As an alternative to welding together separate quartz glass pieces, there are known in the field some forming processes by which sheet glass and other glass items are molded into a desired shape. However, such conventional molding processes are only performed for glasses having relatively low melting (Tg) temperatures (e.g., in the range of 400 to 600° C. Tg) and relatively low viscosities (e.g., in the range of $10^2$ to $10^5$ poise) at deformation temperatures (e.g., in the range of 400 to 1100° C.). As a result, these low melt point temperature and low viscosity glasses can be rather easily molded into a desired shape.

Fused quartz glass, on the other hand, has a relatively high melting temperature and a relatively high viscosity, and thus is much more difficult to form by conventional molding techniques. In particular, it would very difficult to attain a viscosity in the range of $10^2$ to $10^5$ poise for an entire large piece of fused quartz glass. Specifically, in order to attain fused quartz glass with a viscosity in this range, the quartz glass would have to be heated to temperatures of 2000° C. or more, which would result in large radiation heat losses. Further, even by heating fused quartz glass to a temperature of approximately 1600° C. (i.e., around the softening point of fused quartz glass), the glass will not have such a low viscosity (e.g., in the range of $10^2$ to $10^5$ poise). In particular, even at 1600° C., the viscosity of the fused quartz glass would be too high for molding or forming. Thus, forming or molding of fused quartz glass, which has a much higher melting temperature and much higher viscosities than other types of glass, is rather difficult to perform and cannot be done with conventional or off-the-shelf type furnaces used for molding of low melt point and low viscosity glasses. As such, very expensive custom furnaces and complex assemblies have been thought to be required for molding of fused quartz glass.

Accordingly, it would be beneficial to provide improved systems and methods for forming fused quartz glass, and more particularly for producing large fused quartz glass vessels. More particularly, it would be beneficial to provide simplified, efficient and cost-effective systems and methods for molding or forming fused quartz glass into a vessel or chamber free of any weld lines without the need for an expensive and custom-made furnace.

BRIEF SUMMARY OF THE INVENTION

Important aspects of the present invention relate to methods and systems for molding or forming fused quartz glass having viscosities much higher than the types of glass typically subjected to such molding or forming techniques. In particular, the present inventors have found a method and system of molding fused quartz glass which does not require the fused quartz glass to have a viscosity in the range of $10^2$ to $10^5$ poise, as typically required. Instead, according to aspects of the present invention, a body of fused quartz glass having a relatively higher viscosity in the range of $10^5$ to $10^{13}$ poise, at a deformation temperature in the range 1200° C. to 1700° C., may be molded or formed into a large process vessel (e.g., a vessel having a diameter greater than 200 mm).

One preferred embodiment of the present invention is directed to a method of forming fused quartz glass. The method comprises the steps of (a) providing a starting body made of fused quartz glass; (b) positioning the fused quartz glass starting body on a base plate; (c) inserting a first insert device into an interior cavity of the fused quartz glass starting body to form an assembled structure; (d) heating the assembled structure to a predetermined temperature at which the fused quartz glass of the starting body has a viscosity in a range of $10^5$ to $10^{13}$ poise; and (e) deforming the fused quartz glass of the starting body at the predetermined temperature or in the viscosity range of $10^5$ to $10^{13}$ poise around the first insert device to change a shape of the starting body.

Another preferred embodiment of the present invention relates to a method for making a fused quartz glass vessel, particularly one having a diameter of 200 mm or greater. The method comprises the steps of: (a) providing a starting body made of fused quartz glass and (b) positioning the fused quartz glass starting body on a base plate. The method further comprises a first forming stage and a second forming stage. The first forming stage comprises: (i) inserting a first insert device into an interior cavity of the fused quartz glass starting body to form a first assembled structure, (ii) heating the first assembled structure to a predetermined temperature at which the fused quartz glass of the starting body has a viscosity in a range of $10^5$ to $10^{13}$ poise; and (iii) deforming the fused quartz glass of the starting body at the predetermined temperature or in the viscosity range of $10^5$ to $10^{13}$ poise around the first insert device to form an intermediate body made of fused quartz glass. The second forming stage comprises: (i) removing the first insert device and inserting a second insert device into an interior cavity of the fused quartz glass intermediate body to form a second assembled structure, and (ii) heating the second assembled structure to the predetermined temperature while simultaneously pressing an exterior surface of the fused quartz glass intermediate body by a pressing plate to cause deformation of the fused quartz glass of the intermediate body around the second insert device to form a fused quartz glass vessel. The second insert device has an overall size different from that of the first insert device.

Another preferred embodiment of the present invention relates to a forming assembly for forming fused quartz glass comprising a base plate configured to support a body made of fused quartz glass, a pressing plate configured to press on the fused quartz glass body during heating of the fused quartz glass body, first and second insert devices, and a heating device configured to heat the body to a temperature in a range of 1200° C. to 1700° C. such that the fused quartz glass has a viscosity in a range of $10^5$ to $10^{13}$ poise. Each of the first and second insert devices is configured to be separately received within the fused quartz glass body.

Advantageous refinements of the invention, which can be implemented alone or in combination, are specified in the dependent claims. Features and details that are described in the context of the forming assembly shall also apply in relation to the method, and vice versa.

In summary, the following embodiments are proposed as particularly preferred in the scope of the present invention:

Embodiment 1: A method of forming fused quartz glass, the method comprising the steps of: (a) providing a starting body made of fused quartz glass, the starting body having an interior cavity; (b) positioning the starting body on a base plate; (c) inserting a first insert device into the interior cavity of the starting body to form an assembled structure; and (d) heating the assembled structure to a predetermined temperature at which the fused quartz glass has a viscosity in a range of $10^5$ to $10^{13}$ poise; and (e) deforming the fused quartz glass of the starting body at the predetermined temperature or in the viscosity range of $10^5$ to $10^{13}$ poise around the first insert device to change a shape of the starting body.

Embodiment 2: The method according to the preceding embodiment, characterized in that the fused quartz glass is pure quartz glass.

Embodiment 3: The method according to any one of the two preceding embodiments, characterized in that the fused quartz glass is a composite quartz glass.

Embodiment 4: The method according to any one of the three preceding embodiments, characterized in that the predetermined temperature is a temperature in a range of 1200° C. to 1700° C.

Embodiment 5: A method for making a fused quartz glass vessel, the method comprising the steps of: (a) providing a starting body made of fused quartz glass, the starting body having an interior cavity; (b) positioning the starting body on a base plate; (c) in a first forming stage, (i) inserting a first insert device into the interior cavity of the starting body to form a first assembled structure, (ii) heating the first assembled structure to a predetermined temperature at which the fused quartz glass of the starting body has a viscosity in a range of $10^5$ to $10^{13}$ poise, and (iii) deforming the fused quartz glass of the starting body at the predetermined temperature or in the viscosity range of $10^5$ to $10^{13}$ poise around the first insert device to form an intermediate body made of fused quartz glass; and (d) in a second forming stage, (i) removing the first insert device and inserting a second insert device into an interior cavity of the intermediate body to form a second assembled structure, the second insert device having an overall size different from that of the first insert device, and (ii) heating the second assembled structure to the predetermined temperature while simultaneously pressing an exterior surface of the intermediate body by a pressing plate to cause deformation of the intermediate body around the second insert device to form a fused quartz glass vessel.

Embodiment 6: The method according to the preceding embodiment, characterized in that the quartz glass vessel has a diameter of 200 mm or greater.

Embodiment 7: The method according to any one of the two preceding embodiments, characterized in that the starting body has a cylindrical shape.

Embodiment 8: The method according to any one of the three preceding embodiments, characterized in that the cylindrical starting body has an open first end, an open second end and a sidewall extending therebetween.

Embodiment 9: The method according to any one of the four preceding embodiments, characterized in that the method is carried out within a closed furnace.

Embodiment 10: The method according to any one of the five preceding embodiments, characterized in that an inert gas is introduced into the closed furnace.

Embodiment 11: The method according to any one of the six preceding embodiments, characterized in that the inert gas comprises nitrogen.

Embodiment 12: The method according to any one of the seven preceding embodiments, characterized in that the method further comprises cooling the fused quartz glass vessel after the second forming stage.

Embodiment 13: The method according to any one of the eight preceding embodiments, characterized in that the fused quartz glass vessel is shaped as an ellipse or oval.

Embodiment 14: The method according to any one of the nine preceding embodiments, characterized in that the predetermined temperature is a temperature in a range of 1200° C. to 1700° C.

Embodiment 15: The method according to any one of the ten preceding embodiments, characterized in that the predetermined temperature is a temperature in a range of 1300° C. to 1400° C.

Embodiment 16: The method according to any one of the eleven preceding embodiments, characterized in that the fused quartz glass vessel is devoid of weld lines.

Embodiment 17: A forming assembly for forming fused quartz glass comprising: a base plate configured to support a body made of fused quartz glass; a pressing plate configured to press on the body during heating of the body; a first insert device and a second insert device, each of the first and second insert devices being configured to be separately received within the body; and a heating device configured to heat the body to a temperature in a range of 1200° C. to 1700° C. such that the fused quartz glass has a viscosity in a range of $10^5$ to $10^{13}$ poise.

Embodiment 18: The assembly according to any the preceding embodiment, characterized in that each of the base plate, the pressing plate, the first insert device, and the second insert device comprises graphite.

Embodiment 19: The assembly according to any one of the two preceding embodiments, characterized in that the base plate is stationary and the pressing plate is movable.

Embodiment 20: The assembly according to any one of the three preceding embodiments, characterized in that each of the first and second insert devices comprises a first support plate, a second support plate spaced apart from the first support plate, and at least one spacer extending between the first and second support plates, an overall size of the first insert device being different from an overall size of the second insert device.

BRIEF DESCRIPTION OF THE DRAWINGS

The foregoing summary, as well as the following detailed description of preferred embodiments of the present invention, will be better understood when read in conjunction with the appended drawings. For the purpose of illustration, there is shown in the drawings embodiments which are presently preferred. It should be understood, however, that the system and method are not limited to the precise arrangements and instrumentalities shown.

In the drawings.

DETAILED DESCRIPTION OF THE INVENTION

The present invention relates to a system and method for forming fused quartz glass, and more particularly for forming a fused quartz glass vessel of a desired shape. It will be understood by those skilled in the art that the vessels produced from the below described system and methods may be utilized for various purposes. More particularly, the present invention relates to a method for producing large fused quartz glass vessels from starting bodies of fused quartz glass. Preferably, fused quartz glass vessels according to the present invention serve as a process vessel or chamber. The fused quartz glass vessels according to the present invention preferably serve as process chambers for the semiconductor industry (e.g., for semiconductor wafer processing), LED panel processing and photovoltaic substrate processing (e.g., for thin film deposition). More preferably, any physical vapor deposition, chemical vapor deposition and other coating/deposition processes, particularly those which require a controlled and/or non-reactive atmosphere, can be performed within the process vessels and chambers produced by the system and methods of the present invention. More preferably, any processing which requires high temperature, high purity, rapid heating and cooling, and/or a controlled atmosphere for processing above 400° C. can be performed within the process vessels according to the present invention.

It will be understood that, in the context of this application, the terms "about" or "approximately" mean a variation of ±5% of the recited or claimed values, and more preferably a variation of ±2% of the recited or claimed values, and most preferably the exact recited or claimed values.

Although the terms may be used to denote compositions or components of different silica concentrations, as they are used herein, the term "quartz glass" may be used interchangeably with "silica glass," "fused quartz glass," or "fused silica glass." It will be understood that each of these terms refers to a composition, a material, a component, a product, or an article formed by melting a mixture comprising natural or synthetic sand (silica). Either or both natural or synthetic sand (silica) may be used.

Figure 1:
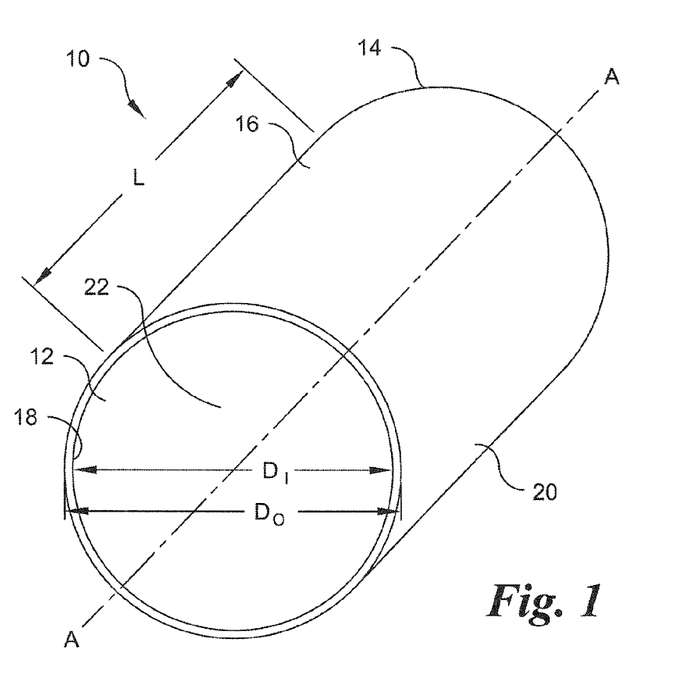
FIG. 1 is a perspective view of a starting tubular body in accordance with one embodiment of the present invention.
Figure 2A:
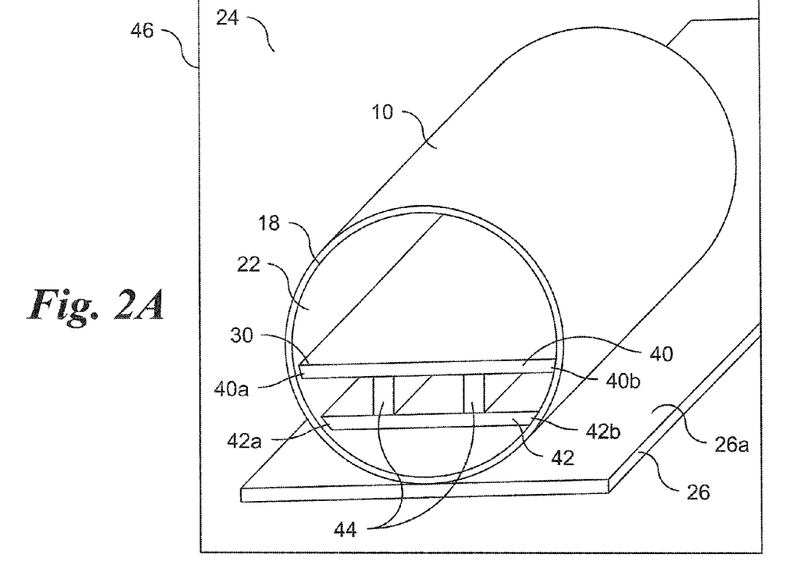
FIG. 2A is a perspective view of a starting tubular body and forming assembly during a first forming stage in accordance with one embodiment of the present invention.
Figure 2B:
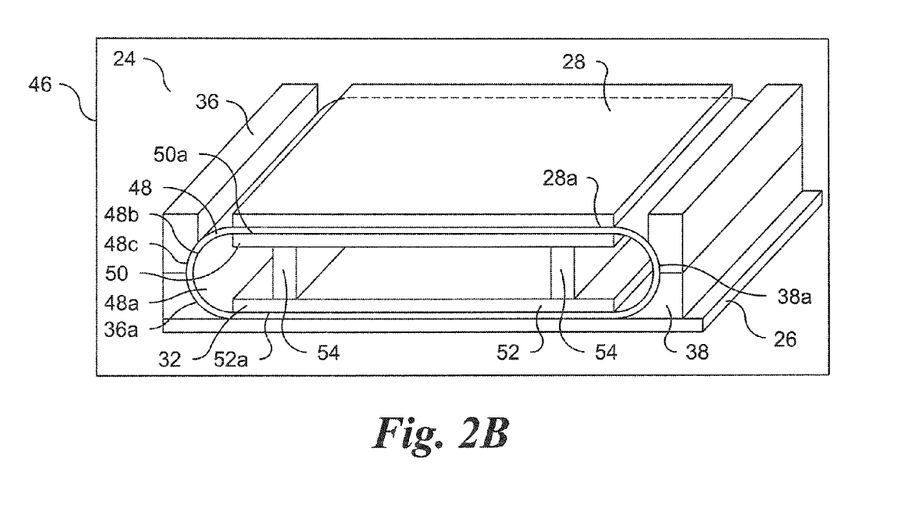
FIG. 2B is a perspective view of an intermediate body, generally shaped as an ellipse or oval, and forming assembly during a second forming stage in accordance with one embodiment of the present invention.

Referring to FIG. 1, there is shown a starting fused quartz glass body 10. A forming assembly 24, shown in FIGS. 2A-2B, is utilized to shape and form the starting fused quartz glass body into a vessel or chamber 34 (see FIG. 3) of a desired shape and dimensions.

Figure 3:
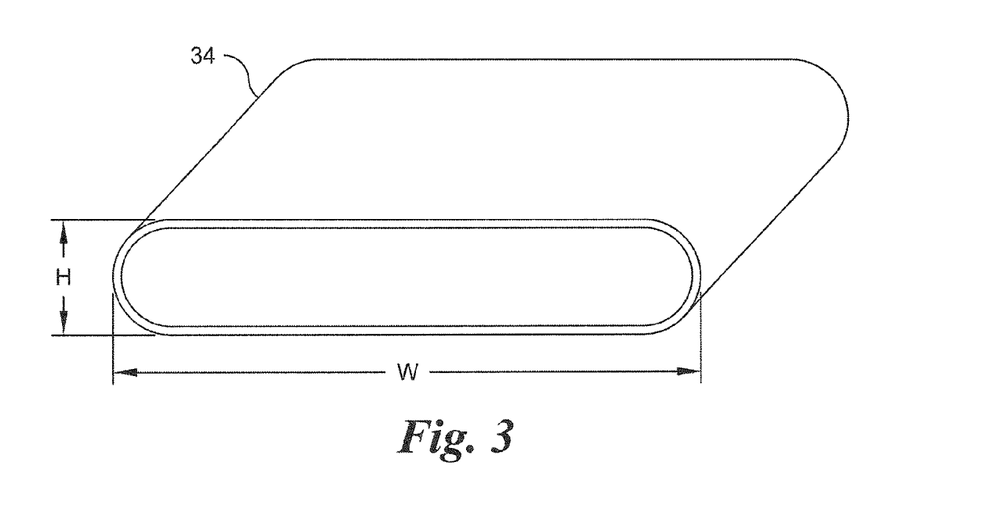
FIG. 3 is a perspective view of a resulting vessel produced from the starting tubular body shown in FIG. 1 in accordance with one embodiment of the present invention.

It will be understood by those skilled in the art that the starting fused quartz glass body 10, the vessel 34, and each component of the forming assembly 24 may have any of a variety of shapes, sizes, configurations, dimensions and the like. More particularly, in one embodiment, the shape, size, configuration and dimensions of the starting body preferably complement the ultimate shape, size, configuration and dimensions of the vessel to be produced. Also, in one embodiment, the shapes, sizes, configurations and dimensions of the various components of the forming assembly will preferably be designed, constructed and/or selected so as to best complement the shapes, sizes, configurations and dimensions of both the starting body and the vessel to be produced. Thus, it will be understood that while a preferred embodiment is discussed in detail below, the present invention is in no way limited to the particular shapes, sizes, configuration and dimensions discussed herein.

The fused quartz glass of the starting body 10 may be pure quartz glass or a quartz glass composite. Preferably, the fused quartz glass body 10 is made of pure quartz glass. Also, it will be understood that if a composite glass is used, the desired viscosity range and forming temperature range may vary from those described herein. For example, the starting body 10 may be made of a composite glass of quartz glass and a lower melt point glass, such that the viscosity vs. temperature curve of the composite glass is lower than that of fused quartz glass and the forming could be done at a lower temperature, thereby utilizing less expensive mold materials and less energy. The fused quartz glass may also be doped with components which lower the viscosity vs. temperature curve of the glass. Any metal oxide may be used as such a dopant. In particular, one example of such a dopant is titanium oxide which has a lower viscosity vs. temperature curve than that of fused quartz glass. Soda-lime glass is another example of a dopant that may be used. Preferably, the concentration of the dopant in the quartz glass is less than approximately 10%, and more preferably less than approximately 5%.

Referring to FIG. 1, in one embodiment, the starting body 10 preferably has a generally tubular shape, as this is the form in which fused quartz glass is most readily available on a commercial scale. More particularly, the starting body 10 has a generally open first or upper end 12, a generally open second or lower end 14, and a sidewall 16 extending between or from the open first end 12 and the open second end 14. However, it will be understood by those skilled in the art that the starting body need not have two open ends, but instead may have only one open end. The sidewall 16 is preferably generally tubular in shape and has an interior surface 18 and an opposing exterior surface 20. The interior surface 18 of the sidewall 16 surrounds and defines a generally cylindrical interior cavity 22 of the starting body. The starting body preferably has a generally circular cross-sectional shape.

However, the starting body 10 is not limited to such a shape and/or configuration. The starting body 10 may have any conceivable configuration and/or shape, such as cubic, tubular, rectangular, elliptical, cylindrical, conical, spherical, frustoconical, and the like, as long as it is hollow or partially hollow and permits the functionality described herein. In one embodiment, the starting body preferably has a shape that generally complements the shape of the vessel 34 to be fabricated, such that material and labor costs and forming time will be reduced.

It will also be understood by those skilled in the art that the dimensions of the starting body 10 may vary based upon the dimensions of the vessel 34 to be fabricated from the starting body. In one embodiment, a length L of the sidewall 16 (as measured along the longitudinal axis A), a thickness of the sidewall 16, an outer diameter Do of the body 10, and an inner diameter $D_I$ of the body 10 (i.e., the diameter of the interior cavity 22) may each be selected to complement the dimensions of the vessel 24 to be produced.

Preferably, the exterior surface 20 of the starting body 10 is a generally smooth surface free of foreign particles. Known mechanical and/or chemical finishing processes may be employed to ensure that the exterior surface has the preferred degree of smoothness and is free of any foreign particles or impurities.

Referring to FIGS. 2A-2B, there is shown a forming or molding assembly 24. The forming assembly 24 comprises a base plate 26, at least one pressing plate 28, and at least a first removable insert device 30. More preferably, the forming assembly 24 further includes at least a second removable insert device 32. It will be understood by those skilled in the art that the forming assembly is not limited to two insert devices and one pressing plate, and instead may include several inserts and/or pressing plates. The forming assembly 24 also preferably includes at least a first lateral support 36 and a second lateral support 38, but it will be understood that the assembly may include additional supports (e.g., front and rear supports). It will also be understood that supports of different sizes, shapes, configurations and dimensions may be utilized at different stages of the forming process. The forming assembly 24 is preferably positioned within a heating device or furnace 46, as described in greater detail below.

Preferably, the base plate 26 is stationary and the pressing plate 28 is movable. The base plate 26, the pressing plate 28, the first and second insert devices 30, 32 and/or the first and second supports 36, 38 are each preferably made of graphite, quartz glass, silicon carbide or other refractory ceramic or refractory metallic materials. More preferably, the base plate 26, the pressing plate 28, the first and second insert devices 30, 32, and the first and second supports 36, 38 are each made entirely of graphite, and most preferably of pure graphite since quartz glass does not react with or adhere to graphite.

Each component (i.e., the base plate 26, the pressing plate 28, the first and second insert devices 30, 32 and the first and second supports 36, 38) of the forming assembly 24 has one or more exterior surfaces which will contact fused quartz glass at some point during the fabrication process. As such, if a forming assembly component is not made of graphite, the contact surface of the component is preferably provided with a graphite powder or foil coating. However, it will be understood by those skilled in the art that the coating may comprise any material which is not reactive with fused quartz glass.

Also, it will be understood by those skilled in the art that every component need not be made entirely of graphite. Instead, some components of the forming assembly 24 may be made entirely of graphite, while others are made of quartz glass, silicon carbide or other refractory ceramic or refractory metallic materials and include graphite or a non-stick coating only on contact surfaces.

Each forming assembly component is utilized at different stages of the forming or fabrication process to support, deform and/or shape the starting body 10 into the resulting vessel 34 of the desired shape, size, configuration and dimensions. Characteristics of the various components of the forming assembly 24 will now be described in detail, in the context of the particular steps of the fabrication process.

In a preferred embodiment, the starting body 10 has a generally tubular shape (i.e., a circular cross-section) and the vessel 34 to be produced therefrom is generally oval, elliptical or D-shaped in cross-section (see FIG. 3). While a preferred embodiment of the forming assembly 24 and the forming process is described in detail herein, it will be understood by those skilled in the art that the forming process and forming assembly components are not limited to the steps and/or components described in detail herein. For example, while in a preferred embodiment, the forming process includes two distinct forming stages and two distinct insert devices, the forming process and assembly may alternatively comprise more or fewer stages and insert devices (e.g., only one forming stage and one insert device, three forming stages and three different insert devices, and the like). It will also be understood by those skilled in the art that the shapes, sizes, configurations and dimensions (e.g., length, width and thickness) of the forming assembly components may vary based upon those of the starting fused quartz glass body 10 and the vessel 34 to be produced, and are not limited to the preferred embodiment discussed herein.

The forming process preferably comprises at least two distinct forming stages. During the first stage, as shown in FIG. 2A, the starting fused quartz glass body 10 is placed on the stationary base plate 26. As such, the dimensions (e.g., length and width) of the base plate are preferably sufficiently large so as to ensure that at least a portion of the starting fused quartz glass body 10 and the resulting vessel 34, and more preferably the entirety of the starting fused quartz glass body 10 and the resulting vessel 34, can be supported on the base plate. As such, a portion of the exterior surface 26a of the base plate contacts the starting body and the resulting vessel 34. Preferably, the base plate has a rectangular or square shape, although it will be understood that the base plate may have any shape as long as it can adequately support the starting fused quartz glass body and the resulting vessel.

The base plate 26 preferably has a generally flat configuration. However, it will be understood that the base plate, and more particularly the contact surface 26a of the plate, may have a surface structure or profile which ensures that the resulting vessel 34, and more particularly the surface of the resulting vessel, has the desired shape and structure. More particularly, the contact surface 26a of the base plate may have any structure (e.g., one or more protrusions or one more recesses of various configurations) necessary to form a corresponding structure (e.g., one or more recesses or one or more protrusions of various configurations) in the resulting vessel. For example, if a customer requires that the process vessel include one or more recesses at points along a length of the vessel (e.g., for connection to a pipeline or tubing), the contact surface of the base plate preferably includes one or more protrusions (not shown), such that corresponding recesses (not shown) will be formed on an exterior surface of the resulting vessel.

Referring to FIG. 2A, also during the first stage of the forming process, the first insert device 30 is positioned within the interior cavity 22 of the starting fused quartz glass body 10. In one embodiment, the first insert device 30 preferably includes a first or upper support plate 40, a second or lower support plate 42 spaced apart from the first support plate 40, and one or more spacers 44 extending therebetween. The first and second support plates 40, 42 each preferably has a generally flat configuration and is generally horizontally oriented so as to extend along the length L of the starting body. Preferably, each of the first and second support plates 40, 42 has a length that corresponds to the length L of the starting body, such that the first insert device 30 extends along substantially the entire length, and more preferably the entire length, of the starting body. Each of the first and second support plates 40, 42 is also preferably sufficiently wide such that opposing lateral sides 40a, 40b and 42a, 42b of each of the plates 40, 42 contacts the interior surface 18 of the starting body 10 at different positions along the circumference thereof.

The one or more spacers 44 are preferably vertically oriented between the spaced-apart, horizontally-oriented support plates 40, 42. The one or more spacers may be of a variety of shapes, sizes, configurations, arrangements and dimensions, as long as they maintain the first and second support plates in the desired spatial arrangement. In one embodiment, two spacers 44 of a generally rectangular cross-sectional shape are positioned between the first and second support plates and extend along the entire length of the first and second support plates to keep the plates spaced apart from each other at a desired distance. However, it will be understood that, instead of two spacers which extend the entire length of the support plates, a plurality of spacers positioned at intervals along the length of the support plates may be provided.

In one embodiment, during the first forming stage, the starting body 10 is positioned between two lateral supports (not shown) which ensure that the starting body is maintained in place during heating and deformation.

The forming assembly 24 is housed within a furnace 46, preferably at a position in the furnace which will provide relatively uniform heating or non-uniform heating if it is desired to have one portion of the part form to the forming assembly 24 before the other parts. Preferably, the forming assembly 24 remains within the furnace 46. However, it will be understood that the forming assembly can be removed from the furnace as long as the assembly remains intact and is not shaken or otherwise disrupted. The furnace may be any type of furnace known in the art or to be developed. The furnace is preferably a continuous, box, belt, oscillatory or any type of furnace or kiln that can achieve heating temperatures of between approximately 1200° C. and approximately 1700° C. Most preferably, the furnace is a box type furnace that can reach temperatures in the range of 1200° C. to 1700° C. Also, the heater elements (not shown) of the furnace are preferably electric resistance heaters, which ensure that any impurities in the environment of the furnace are minimized.

The furnace is preferably configured to reach temperatures of between 1200° C. and 1700° C., because the quartz glass of the starting body 10 is susceptible to plastic deformation at such temperatures. More preferably, the furnace is maintained at a temperature of approximately 1300° C. to approximately 1400° C. Most preferably, the furnace is maintained at a heating temperature of approximately 1375° C. At such temperatures, the viscosity of the fused quartz glass material is preferably between approximately $10^5$ and $10^{13}$ poise, more preferably between $10^8$ and $10^{11}$ poise, and most preferably approximately $10^9$ poise.

In order to limit the amount of oxygen introduced into the furnace and to thus extend the life of the graphite forming assembly components, the furnace is preferably maintained at atmospheric pressure, and more preferably at slightly above atmospheric pressure of approximately 0.005" water column.

Once the starting body 10 is positioned on the base plate 26 and first insert device 30 is positioned in the starting body, the furnace 46 is preferably closed and the heater elements of the furnace begin to heat the fused quartz glass material starting body up to the desired forming temperature. Preferably, the starting body is heated up to a forming temperature between approximately 1200° C. and approximately 1700° C., and more preferably between approximately 1300° C. and approximately 1500° C., and most preferably approximately 1375° C. Reaching the desired forming temperature generally requires approximately 1 to 3 hours, and more preferably approximately 1.5 to 2.5 hours, and most preferably approximately 2 hours. During this pre-heating stage, deformation of the starting body begins to occur at a temperature of 1150° C. to 1200° C.

Once the desired forming temperature (e.g., approximately 1375° C.) has been reached, the furnace 46 is maintained at the forming temperature for a predetermined period of time. Preferably, during the first forming stage, the starting body 10 is heated in the furnace at the desired forming temperature for approximately 1 to 3 hours, and more preferably approximately 1.5 to 2.5 hours, and most preferably approximately 2 hours, to effect the desired plastic deformation. If necessary, compressive pressure may be applied to the starting body during this first forming stage in order to induce the desired deformation. For example, the pressing plate 28 or a pressing plate of a different configuration which complements the shape of the starting body may be used in the first forming stage.

It will be understood by those skilled in the art that the invention is not limited to the time periods described herein, as the time required to effect the desired plastic deformation of the quartz glass material of the starting body 10 will depend upon various parameters, such as the furnace temperature, the presence of any compressive pressure, the shape and size of the starting body, the shape and size of the resulting vessel, and the like.

During the first forming stage, the base plate 26 in conjunction with the first insert device 30 and any optional lateral supports and/or pressing plates form a forming assembly 24 which determines an intermediate shape as the starting body 10 transitions and deforms into the vessel 34. More particularly, while the base plate 26 and the first insert device 30 retain their shapes at temperatures of 1200° C.-1700° C., the fused quartz glass material of the starting body 10 is subject to plastic deformation at these temperatures. Thus, during the first stage of the forming process, the heat of the surrounding furnace causes deformation of the starting body around the first insert device, such that the shape of the starting body is changed. More particularly, deformation of the starting body around the first insert device resulting in the formation an intermediate body 48 of a shape different from the shape of the starting body. The shape of the intermediate body is defined by the structure, configuration and/or positioning of the base plate 26 and the first insert device 30 (see FIG. 2B). In one embodiment, in which the above-described structure, configuration and positioning of the base plate 26 and the first insert device 30 are utilized, the generally cylindrical starting body 10 is preferably transformed or deformed into an intermediate body shaped generally as an oval or ellipse.

However, it will be understood that the invention is not limited to an intermediate body shaped generally as an oval or ellipse. The shape of the intermediate body may be adjusted, as necessary, simply by varying the structure, configuration and/or positioning of the base plate 26 and/or the first insert device 30. For example, the configuration of the first insert device 30 may be changed by arranging the first and second support plates 40, 42 to be spaced apart at a greater distance, such that the respective lateral sides 40a, 40b and 42a, 42b of the plates would contact the interior surface 18 of the starting body 10 at different positions. As such, the resulting intermediate body would have a shape and dimensions (e.g., a height and a width) that differ from those obtained by a first insert device having support plates spaced more closely together.

After the fused quartz glass of the starting body 10 has been sufficiently deformed to form the desired shape, size and dimensions of the intermediate body 48, a second forming stage commences. More particularly, after achieving the desired intermediate body, the furnace 46 is opened, the first insert device 30 is removed from the interior cavity 48a of the intermediate body 48, and the second insert device 32 is positioned within the cavity 48a.

Preferably, before the first insert device 30 is removed from the cavity 48a and the second insert device 32 is inserted therein, the starting body 10 and the forming assembly 24 undergo a cooling stage. Cooling of the components facilitates easier replacement of the insert devices. The cooling rate is not critical because fused quartz glass is very thermal shock resistant. Preferably, cooling of the starting body 10 and the forming assembly 24 is carried out by powering off the furnace 46 for a period of time, preferably between 15 and 20 hours, and more preferably for approximately 18 hours, until a temperature of approximately 400° C. to 600° C., and more preferably approximately 500° C., is reached. Cooling of the components may be expedited by also opening the furnace 46, in addition to powering it off.

In one embodiment, the second insert device 32 has a shape and structure very similar to that of the first insert device 30, but the dimensions of the insert devices differ. More particularly, the second insert device preferably includes a first or upper horizontally-oriented support plate 50 of a generally flat configuration, a second or lower horizontally-oriented support plate 52 of a generally flat configuration and spaced apart from the first support plate 40, and one or more vertically-oriented spacers 54 extending therebetween. The one or more spacers 54 may be of a variety of shapes, sizes, configurations, arrangements and dimensions, as long as they maintain the first and second support plates 50, 52 in the desired spatial arrangement.

In one embodiment, in which the resulting vessel 34 to be produced is generally elliptical or D-shaped in cross-section, the dimensions and overall size of the second insert device 32 preferably complement that of an ellipse. More particularly, the dimensions and overall size of the second insert device are preferably larger, and more preferably wider, than that of the first insert device 30. In such an embodiment, while the length of the second insert device will be the same as or almost the same as that of the first insert device, the relatively larger width of the second insert device facilitates stretching or deformation of the intermediate body 48 in the direction of the width thereof, and more particularly in a direction perpendicular to the length L of the starting body 10, such that the resulting vessel is shaped as an ellipse or oval.

During the second forming stage, the intermediate body 48 of fused quartz glass is positioned on the stationary base plate 26 between the first and second lateral supports 36, 38. Also, the second insert device 32 is positioned within the interior cavity 48a of the intermediate body, such that a first surface 50a of the first support plate 50 is proximate an interior surface 48b of the intermediate body and a first surface 52a of the second support plate 52 contacts or rests on the interior surface 48b of the intermediate body. Finally, the pressing plate 28 is placed in a pressing position, in which a first surface 28a of the pressing plate contacts and applies a compressive force to an exterior surface 48c of the intermediate body. Preferably, a compressive force of up to 200 pounds is applied to the exterior surface of the intermediate body. The applied compressive force is more preferably in the range of 20 to 100 pounds, and most preferably approximately 64 pounds.

Similar to the base plate 26, the pressing plate 28 preferably has a generally flat configuration, but the contact surface 28a of the plate may include one or more protrusions or one more recesses of various configurations in order to form a corresponding structure in the resulting vessel 34. In one embodiment, the dimensions (e.g., length and width) of the pressing plate are preferably sufficiently large so as to ensure that at least a portion of the intermediate fused quartz body 48 is covered by the pressing plate. More preferably, the dimensions of the pressing plate are such that the entirety of the intermediate body 48 is covered by the pressing plate. Preferably, the pressing plate has a rectangular or square shape, although it will be understood that the plate may have any shape as long as it can adequately apply the requisite compressive force to the intermediate fused quartz glass body.

The first and second lateral supports 36, 38 are positioned on opposing sides of the intermediate body 48. The first and second lateral supports each has a generally C-shaped cross-section, such that opposing sides of the elliptically shaped intermediate body are received within respective C-shaped recesses 36a, 38a of the first and second lateral supports 36, 38.

Once the intermediate body 48 is securely positioned on the base plate 26 in between the lateral supports 36, 38 and the pressing plate 28 is moved to the pressing position, the temperature of the intermediate body 48 is brought back up to the desired forming temperature, if necessary, and heated at the desired forming temperature for a predetermined period of time. Thus, during the second forming stage, the intermediate body is generally simultaneously subject to pressing and heating to effect deformation of the body.

Preferably, the intermediate body is heated up to a forming temperature between approximately 1200° C. and approximately 1700° C., and more preferably between 1300° C. and approximately 1400° C., and most preferably approximately 1375° C. Once the desired forming temperature (e.g., approximately 1375° C.) has been reached, the intermediate body is heated in the furnace 46 at the desired forming temperature for approximately 1 to 3 hours, and more preferably approximately 1.5 to 2.5 hours, and most preferably approximately 2 hours, to effect deformation of the fused quartz glass material until the desired shape of the vessel 34 is formed. More particularly, at the forming temperature, the fused quartz glass material of the intermediate body deforms around the second insert device 32 to form the fused quartz glass vessel.

It will be understood by those skilled in the art that the time required to deform the quartz glass material of the intermediate body 48 into the desired vessel shape will depend upon various parameters, such as the furnace temperature, the compressive force exerted by the pressing plate, the shape and size of the intermediate body and the like.

It will also be understood that the forming process may be repeated (i.e., more than two forming stages) in order to obtain further complex shapes.

In one embodiment, during one or both of the first and second forming stages, an inert gas is introduced into the furnace through a gas inlet (not shown in the figure), such that the first and second forming stages are performed in an inert gas atmosphere which prevents oxidation of the graphite forming assembly components. The inert gas may be any one of nitrogen, argon, a noble gas (e.g., He, Ne, Kr and Xe), hydrogen, hydrocarbon (natural gas), HCl, or any other gas which will not oxidize graphite. Preferably, the gas to be introduced into the furnace is nitrogen. The gas is preferably introduced at a rate of 2 cubic feet per minute. However, it will be understood by those skilled in the art that the flow rate may vary, as long as an atmosphere of a positive pressure in the furnace and a low oxygen content (preferably below 1%) is achieved.

It will be understood by those skilled in the art that the second forming stage is optional. Specifically, if the desired shape, size and form of the vessel 34 are attained by use of the first insert device 30 in the first forming stage, then no second forming stage (and no second insert device 32) is needed.

Instead, the quartz glass body formed by the first forming stage is preferably subjected to cooling, as described in greater detail below, directly after the first (and sole) forming stage.

After the fused quartz glass of the starting body 10 has been formed or molded into the desired vessel shape, the formed vessel 34 is subjected to a cooling period of a predetermined duration, particularly to prevent devitrification of the fused quartz glass. Preferably, for cooling of the vessel 34, operation of the furnace 46 is ceased, and the vessel is allowed to cool to room temperature within the closed furnace. Cooling of the vessel 34 to room temperature typically takes approximately 10 to 24 hours, and more preferably approximately 18 hours. It will be understood by those skilled in the art that other cooling techniques known in the art or to be developed may be employed. Also, it will be understood that the furnace may be opened to expedite cooling.

The resulting vessel 34 is entirely free of any weld lines. Also, no subsequent mechanical processes, such as grinding or polishing, need to be employed. As such, the vessel 34 has a more uniform strength than conventional fused quartz glass vessels, and is formed by a process which is more cost-effective and less time-consuming that conventional techniques. In particular, since glass strength is nearly entirely dependent upon the condition of the surface, including the concentration of surface flaws, welds and the non-uniform surface associated with welds have a much higher probability of surface flaws as well as compositional irregularities due to the incorporation of impurities during welding or during subsequent grinding to smooth the welds. However, due to the absence of welds on the surface of the vessel 34 according to the present invention, the vessel has superior uniform strength. The process also enables the production of relatively large process vessels. That is, vessels of dimensions, such as heights, widths, lengths, depths, and the like, of greater than 200 mm can be produced.

EXAMPLE 1

A process vessel 34, shown in FIG. 3, was made utilizing a starting body 10 (depicted in FIG. 1) made of pure fused quartz glass. More particularly, the quartz glass material of the starting body was an electrically fused quartz glass with a hydroxide content of less than 30 ppm and trace amounts of elements such as aluminum, calcium, chloride, chromium, copper, iron, potassium, lithium, magnesium, manganese, sodium, titanium, and zirconium.

The starting body 10 had a generally cylindrical or tubular shape with a hollow interior cavity. The starting body had a length of 830 mm, an outer diameter of 467 mm and a sidewall thickness of 4.5 mm. The starting body was placed in the forming assembly 24 and subject to two forming stages as follows. In the first forming stage, the starting body was positioned on the base plate 26 and the first insert device 30, shown in FIG. 2A, was positioned within the interior cavity 22 of the starting body. Within the furnace 46, the starting body was then heated to a forming temperature of 1375° C., which took approximately 3 hours, and was maintained at the forming temperature for approximately 2 hours to form the intermediate body 48 (see FIG. 2B). The intermediate body had the same length as that of the starting body (i.e., 830 mm), a height of approximately 130 mm and a width of approximately 525 mm. At the forming temperature, the fused quartz glass material had a viscosity of approximately $10^9$ Poise.

In the second forming stage, the first insert device 30 was removed and the second insert device 32 was positioned within the interior cavity 48a of the intermediate body 48. The intermediate body remained positioned on the base plate 26 and was further supported by first and second lateral supports 36, 38 to help form the intermediate body into a generally elliptical or oval shape. Finally, the pressing plate 28 was placed in the pressing position, in which it applied approximately 64 pounds of force (due to the weight of the plate) to the intermediate body. The intermediate body was then heated to a forming temperature of 1375° C., which took approximately 3 hours, and was maintained at the forming temperature for approximately 2 hours to form the vessel 34. Nitrogen was injected into the furnace during both the first and second forming stages at a flow rate of approximately 2 cubic feet per minute.

Finally, the furnace 46 was opened to allow the vessel 34 and forming assembly 24 to cool. After cooling to room temperature, the forming assembly 24 and the vessel 34 were removed from the furnace. The formed vessel was easily separated from the graphite forming assembly components. The formed vessel (see FIG. 3) was generally shaped as an ellipse or an oval, with a height H of 130 mm, a width W of 660 mm, a length of 830 mm (i.e., same as the length of the starting body). The formed vessel was also completely devoid of any weld lines and the quartz glass was completely transparent or clear.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A method of forming fused quartz glass, the method comprising the steps of:
    (a) providing a starting body made of fused quartz glass, the starting body having a generally tubular shape and an interior cavity;
    (b) positioning the starting body on a base plate;
    (c) inserting a first insert device into the interior cavity of the starting body to form an assembled structure, the first insert device comprising a horizontal upper support plate, a horizontal lower support plate, and one or more vertically oriented spacers disposed between the upper and lower support plates, wherein opposing lateral sides of each of the plates contacts an interior surface of the starting body at different positions along a circumference thereof;
    (d) heating the assembled structure to a predetermined temperature at which the fused quartz glass has a viscosity in a range of $10^5$ to $10^{13}$ poise; and
    (e) deforming the fused quartz glass of the starting body at the predetermined temperature or in the viscosity range of $10^5$ to $10^{13}$ poise around the first insert device to change a shape of the starting body.

2. The method according to claim 1, wherein the fused quartz glass is pure quartz glass.

3. The method according to claim 1, wherein the fused quartz glass is a composite quartz glass.

4. The method according to claim 1, wherein the predetermined temperature is a temperature in a range of 1200° C. to 1700° C.

5. A method for making a fused quartz glass vessel, the method comprising the steps of:
    (a) providing a starting body made of fused quartz glass, the starting body having a generally tubular shape and an interior cavity;
    (b) positioning the starting body on a base plate;

(c) in a first forming stage,
- (i) inserting a first insert device into the interior cavity of the starting body to form a first assembled structure, the first insert device comprising a horizontal upper support plate, a horizontal lower support plate, and one or more vertically oriented spacers disposed between the upper and lower support plates, wherein opposing lateral sides of each of the plates contacts an interior surface of the starting body at different positions along a circumference thereof
- (ii) heating the first assembled structure to a predetermined temperature at which the fused quartz glass of the starting body has a viscosity in a range of $10^5$ to $10^{13}$ poise, and
- (iii) deforming the fused quartz glass of the starting body at the predetermined temperature or in the viscosity range of $10^5$ to $10^{13}$ poise around the first insert device to form an intermediate body made of fused quartz glass; and (d) in a second forming stage,
- (i) removing the first insert device and inserting a second insert device into an interior cavity of the intermediate body to form a second assembled structure, the second insert device having an overall size different from that of the first insert device, and
- (ii) heating the second assembled structure to the predetermined temperature while simultaneously pressing an exterior surface of the intermediate body by a pressing plate to cause deformation of the intermediate body around the second insert device to form a fused quartz glass vessel.

6. The method according to claim 5, wherein the quartz glass vessel has a diameter of 200 mm or greater.

7. The method according to claim 1, wherein the cylindrical starting body has an open first end, an open second end and a sidewall extending therebetween.

8. The method according to claim 5, wherein the method is carried out within a closed furnace.

9. The method according to claim 8, wherein an inert gas is introduced into the closed furnace.

10. The method according to claim 9, wherein the inert gas comprises nitrogen.

11. The method according to claim 5, further comprising cooling the fused quartz glass vessel after the second forming stage.

12. The method according to claim 5, wherein the fused quartz glass vessel is shaped as an ellipse or oval.

13. The method according to claim 5, wherein the predetermined temperature is a temperature in a range of 1200° C. to 1700° C.

14. The method according to claim 5, wherein the predetermined temperature is a temperature in a range of 1300° C. to 1400° C.

15. The method according to claim 5, wherein the fused quartz glass vessel is devoid of weld lines.

* * * * *